3,309,196
FLUXING AGENT
Thomas M. Kaneko, Trenton, and Erwin C. Handwerk, Grosse Ile, Mich., assignors to Wyandotte Chemicals Corporation, Wyandotte, Mich., a corporation of Michigan
No Drawing. Filed Oct. 28, 1964, Ser. No. 407,217
9 Claims. (Cl. 75—94)

This invention relates to a metallurgical fluxing material. More particularly, this invention relates to a novel fluxing composition and agglomerates prepared therefrom for use in metallurgical reduction operations.

In order to separate metals, such as iron, from impurities with which the metal may be chemically combined or physically mixed, such as in ores, scrap metal, fines from smelting operations, etc., fusion of the material is customary. Generally, such separation involves the reduction of the metal from its compounds and its separation from the mechanical mixture. Many of the impurities associated with iron ores are of a highly refractory nature, that is, they are difficult to melt. If they remain unfused, they retard the smelting operation and interfere with the separation of metal and slag. Thus, a flux is generally employed and a primary purpose of the flux is to render such substances more easily fusible. For this purpose in the reduction of iron from oxidized iron material, fluorspar is the most commonly used substance. However, fluorspar is a relatively expensive material and a high percentage of it must be imported. Therefore, a less expensive substitute material is highly desirable and has been sought by those skilled in the art.

Accordingly, it is a purpose of this invention to provide a flux for the purpose of making slags more fusible in the reduction of oxidized iron material which flux may be easily obtainable and which is characterized by a relatively low cost.

According to the instant invention, a novel metallurgical fluxing composition is provided comprising lime, alumina, soda, and silica. As used herein, the words "lime," "alumina," "soda," and "silica" refer, respectively, to the oxides of calcium, aluminum, sodium, and silica, generally CaO, $Al_2O_3$, $Na_2O$, and $SiO_2$ and to compositions containing calcium, aluminum, sodium, silicon, and an amount of oxygen equivalent to that required to form oxides with the calcium, aluminum, sodium, and silicon present in the composition. In order to prepare such compositions, high purity materials are not necessarily required. The alumina content may be supplied by incorporating dross and/or skimmings from metallurgical operations or bauxite or both in the fluxing composition. The soda content may be supplied by incorporating soda ash (sodium carbonate), caustic soda (sodium hydroxide), or sodium silicate in the fluxing composition, and the silica may be supplied by incorporating any conventional source of silica, such as sand in the fluxing composition. It is preferred that the fluxing composition comprise by weight about 20 to 35 percent lime, about 20 to 35 percent alumina, about 5 to 20 percent soda, and about 5 to 25 percent silica.

The components of this composition are generally particulate materials and it is preferred to employ agglomerates of these particulate materials suitable for metallurgical fluxing since such materials, if not agglomerated, tend to fuse or bridge over or to be flushed out with the early slag before accomplishing their metallurgical function when employed in metallurgical furnaces and tend to be carried out through the top if used in a blast furnace or similar apparatus.

While various materials, which are capable of supplying soda to the composition, would provide suitable fluxing properties, it is desirable and for some applications essential that the agglomerates be strong and hard and thus capable of withstanding shipping and handling, the impact of being dropped into a blast furnace or other metallurgical apparatus, and the crushing due to the weight of additional agglomerates and other materials superimposed upon them. It has been found that agglomerates or pellets prepared from mixtures which include caustic soda are greatly superior in terms of hardness and strength to pellets employing other materials which are capable of supplying soda to the composition. In addition, it has been found that pellets wherein all the soda is supplied by incorporating caustic soda in the pellets could be dropped distances greater than 6 feet or thrown against a concrete wall without breaking. Further, pellets incorporating caustic soda do not produce the objectionable fumes that are generally produced from the vaporization of soda ash.

The agglomerates or pellets may also include initially an oxidized iron material, particularly an iron ore type of material, and carbon which forms FeO in situ, thereby lowering the viscosity of the slag material produced. In general, where the agglomerates contain such material, it is included in amounts by weight of the total mixture equivalent to about 1 to 20 percent hematite ($Fe_2O_3$) and about 0.2 to 5 percent carbon. The carbon content is most easily supplied by incorporating a material selected from the group consisting of coal, coke, and charcoal.

In a preferred method of preparing the agglomerates or pellets, a lime-caustic soda mixture is prepared by mixing lime dust with a 50% aqueous caustic soda solution and aging for a period of about 12 hours to vaporize some of the excess water. As an alternative the lime-caustic mixture may be prepared by mixing hydrated lime with anhydrous caustic soda. The lime-caustic mixture is then mixed with the alumina material, such as bauxite or aluminum dross and/or skimmings, iron ore, sand, carbon, e.g. charcoal, coke or coal, and additional caustic soda, such as 50% aqueous caustic soda solution plus some anhydrous caustic soda to form a pelletizing mix. The charcoal, coke, or coal used is generally finely divided material, such as coke breeze or crushed and screened coal, and the particle size of the material should be at least capable of passing through a screen of about 20 mesh. Generally, a sufficient amount of water is present in the pelletizing mix to provide a pasty mass suitable for agglomeration. This generally amounts to from about 8 to 20 percent water, by weight of the total mixture depending on the method of agglomeration. The moist mixture is then agglomerated or pelletized by one of the conventional techniques, such as by subjecting the mix to a rolling motion in a rotating open-end drum or cylinder or a rotating disc, whereby the material rolls upon itself and thereby gradually agglomerates into small, generally spheroidal, bodies or agglomerates. Spraying a small amount of water amounting to 1 to 8 percent during agglomeration facilitates control of the growth of the agglomerates. It is preferred to dry the agglomerates by feeding into a suitable heating device or furnace. The agglomerates or pellets are then heated or sintered at a temperature of about 1300 to 1600° F. A sintering apparatus such as, for example, a machine of the type shown and described on pages 225 and 226, vol. 8 of the Kirk-Othmer Encyclopedia of Chemical Technology, Interscience Encyclopedia, Inc., New York, for a countercurrent oil-, coal-, or gas-fired rotary kiln may be employed for the sintering step.

It is also sometimes desirable to employ a conventional binding material, such as lignin sulfonate (i.e., sulfite pulp waste liquor containing 50% solids), bentonite, Portland cement, etc.

The following examples illustrate the practice of this invention:

Example 1

100 pounds of lime dust containing 81 percent active CaO was mixed with 80 pounds of 50% aqueous sodium hydroxide solution. After mixing the first 10 pounds of the 50% aqueous sodium hydroxide solution with the lime dust, the mixture is allowed to stand for 15–20 minutes during which time the temperature rises to 320–340° F. The balance of the 80 pounds of aqueous sodium hydroxide solution was then added slowly while mixing over 20–30-minute period, followed by additional mixing for about 5 minutes, after which the mixture was allowed to age overnight. The mixture lost about 4 pounds due to vaporization of water during the aging to produce a 176-pound lime-caustic mixture.

88 pounds of the above prepared lime-caustic mixture, 92 pounds of bauxite, 27.7 pounds of taconite, 10.7 pounds of sand, 3.2 pounds of coke breeze, 12.8 pounds of 50% aqueous sodium hydroxide solution and 6.6 pounds of anhydrous sodium hydroxide were then intimately mixed. The entire mix was then pelletized or formed into spheres of ¼ inch to 1 inch diameter by rolling on a 3-foot diameter disc pelletizer, rotated at approximately 40 r.p.m. The mixture was fed to the disc by hand at a rate of 96.5 pounds per hour with water sprayed intermittently at 6.3 pounds per hour.

The pellets were dried overnight in an oven maintained at about 230° F., the pellets losing about 14.0 percent of their weight due to drying. A number of batches as described above, having a total weight of 241 pounds each, were made up to supply 4132 pounds of oven-dried material.

The entire batch weighing 4132 pounds was then fed at a rate of 120 pounds per hour to a conventional rotary kiln 12.5 feet long, 15 inches inside diameter, having a refractory lining and rotating at 1.5 r.p.m. The kiln was heated by an 8-inch diameter horizontal, luminous gas flame extending along the cylinder axis for a distance of about 8 feet from the nozzle, thereby creating a large, general heating area countercurrent to the flow of the charge providing a bed temperature of 1350° F. The cylinder slope was ⅛ of an inch per foot which gave a retention time within the cylinder of 30 minutes for the material being processed. The pellets produced were very hard and strong and would not break when dropped 6 feet onto a concrete floor.

2400 pounds of the pellets were tested in a 13-ton electric furnace for producing tool steels wherein they demonstrated good fluxing ability. Further, visual observations indicated that the attack on refractory linings by use of these pellets was negligible in comparison with that by use of fluorspar.

Example 2

A 3000-pound batch of pellets was prepared by the method and under the conditions set forth in Example 1, with the exception that the initial lime-caustic mixture was prepared from hydrated lime and anhydrous sodium hydroxide with sufficient water added to obtain a lime-sodium hydroxide mix having a free moisture content of about 3.5 percent. The steps following the preparation of the initial lime-caustic mix were the same as Example 1 and the pellets produced were very strong and would not break on dropping 6 feet onto a concrete floor.

1500 pounds of these pellets were tested in a 4-ton electric furnace for the refining of stainless steel grindings wherein they demonstrated good fluxing ability.

Example 3

A series of six 1-pound batches of agglomerates, having thicknesses of from about 1½ to 2 inches, were prepared by hand from powdered lime, alumina, soda ash, and glass grade sand. The lime and soda ash were mixed with an amount of water of about 15–20 percent by weight based on the total weight of all the dry ingredients. The remaining ingredients were then added and the mixture mixed to a thick paste and molded into conical agglomerates. The agglomerates were allowed to air-dry for three hours and then oven-dried for three hours. The proportions by weight of lime, alumina, soda, and silica in the agglomerates were as shown in Table I below.

TABLE I

| Components | Batch No. | | | | | |
|---|---|---|---|---|---|---|
| | 1 | 2 | 3 | 4 | 5 | 6 |
| CaO | 17.7 | 22.7 | 22.7 | 12.7 | 20.1 | 28.4 |
| $Al_2O_3$ | 50.3 | 45.3 | 45.3 | 46.1 | 36.5 | 25.7 |
| $Na_2O$ | 10.9 | 10.9 | 10.9 | 14.1 | 14.8 | 15.6 |
| $SiO_2$ | 21.1 | 21.1 | 21.1 | 27.1 | 28.6 | 30.3 |

These agglomerates were subjected to melting point tests and were found to have melting points sufficiently low for satisfactory fluxing.

Example 4

Eight 1-pound batches of agglomerates were made up in the same manner as described in Example 3, with the exception that chemical grade bauxite was substituted for the alumina in batches 5–8 and iron oxide in the form of hematite using open-hearth fume as the raw material was added to the lime-soda ash-water mixture with the bauxite and sand.

The proportions of lime, alumina, soda, silica, and hematite in the agglomerates were as shown in Table II below.

TABLE II

| Components | Batch No. | | | | | | | |
|---|---|---|---|---|---|---|---|---|
| | 1 | 2 | 3 | 4 | 5 | 6 | 7 | 8 |
| CaO | 17.5 | 18.8 | 11.2 | 11.9 | 20.1 | 23.9 | 23.9 | 23.9 |
| $Al_2O_3$ | 31.8 | 34.2 | 40.4 | 43.2 | 36.5 | 32.6 | 32.6 | 32.6 |
| $Na_2O$ | 12.9 | 13.8 | 12.3 | 13.2 | 14.8 | 13.3 | 13.3 | 13.3 |
| $SiO_2$ | 18.8 | 23.0 | 18.0 | 21.9 | 28.6 | 12.8 | 12.8 | 12.8 |
| $Fe_2O_3$ | 19.0 | 10.2 | 18.1 | 9.8 | ------ | 17.4 | 17.4 | 17.4 |

These agglomerates were subjected to melting point tests and were found to have melting points sufficiently low for satisfactory fluxing.

Example 5

A series of fourteen 1-pound batches of approximately 1-inch diameter round pellets were prepared from lime, alumina, a source of soda as indicated in Table III below, glass grade sand, hematite open-hearth fume, and in some batches a binder as indicated in Table III below. The pellets were prepared by rolling by hand, and for batches 1 and 13 of Table III below the material was compacted at 2500 p.s.i. and 1200 p.s.i., respectively, with a Carver press in a 1-inch diameter mold. The pellets consisted of, by weight of dry ingredients, 26.8 percent lime, 24.2 percent alumina, 14.3 percent of the sand, and 17.1 percent of the hematite open-hearth fume. The source of soda was present in an amount sufficient to provide 14.8 percent $Na_2O$. The weight percentages of the total soda content obtained from each source is indicated in Table III below. The water and binder where present were added to the above ingredients in the percentages by weight of the total of the above ingredients shown in Table III below. The pellets were fired in a globar furnace at 600–700° C. Those pellets wherein 100 percent of the soda was obtained from sodium hydroxide exhibited strength and hardness characteristics substantially superior to the balance of the pellets.

TABLE III

| Batch No | 1 | 2 | 3 | 4 | 5 | 6 | 7 | 8 [1] | 10 [1] | 11 | 12 | 13 | 14 |
|---|---|---|---|---|---|---|---|---|---|---|---|---|---|
| Na$_2$O Content of Pellets Added as: | | | | | | | | | | | | | |
| Na$_2$CO$_3$, percent | 100 | 100 | 100 | 100 | 100 | | 100 | 50 | 50 | | | 50 | 50 | |
| NaOH, percent | | | | | | 100 | | 50 | 50 | | | 50 | 50 | |
| Na$_2$SiO$_3$, percent | | | | | | | | | | 100 | | | | 100 |
| Water, percent | 30 | 35 | 30 | 47 | 50 | 50 | 50 | 50 | 50 | 50 | 100 | 50 | 50 | 50 |
| Binder | | [2] LS | | [3] B | [3] B | ([4]) | | | | | | | | |
| Percent Added | | 2 | | 4 | 1 | 5 | | | | | | | | |
| Strength of Pellets | Poor | Poor | Fair | Fair | Poor | ([5]) | Poor | Fair | Fair | Good | Poor | Poor | Fair | ([5]) |

[1] Equivalent weight of CaCO$_3$ used instead of CaO for the pellet lime content.
[2] Lignin Sulfonate, i.e. Sulfite pulp waste liquor containing 50% solids.
[3] Bentonite.
[4] Portland Cement.
[5] Very good.

It is to be understood that various changes and modifications may be made in the foregoing composition and process without departing from the spirit of the invention and scope of the appended claims.

What is claimed is:

1. Pellets of agglomerated particulate material suitable for metallurgical fluxing consisting essentially of by weight about 20 to 35 percent lime, about 20 to 35 percent alumina, about 5 to 20 percent soda, and about 5 to 25 percent silica.

2. Strong, hard pellets of agglomerated particulate material suitable for metallurgical fluxing consisting essentially of lime, sodium hydroxide, bauxite, sand, and oxidized iron material in amounts sufficient to provide the equivalent by weight of about 20 to 35 percent lime, about 20 to 35 percent alumina, about 5 to 20 percent soda, about 5 to 25 percent silica, and about 1 to 20 percent hematite.

3. Strong, hard pellets of agglomerated particulate material suitable for metallurgical fluxing consisting essentially of lime, sodium hydroxide, bauxite, sand, oxidized iron material, and coke in amounts sufficient to provide the equivalent by weight of about 20 to 35 percent lime, about 20 to 35 percent alumina, about 5 to 20 percent soda, about 5 to 25 percent silica, about 1 to 20 percent hematite, and about 0.2 to 5 percent carbon.

4. Pellets of agglomerated particulate material suitable for metallurgical fluxing consisting essentially of lime, soda ash, aluminum oxide, and sand in amounts sufficient to provide the equivalent of by weight about 20 to 35 percent lime, about 20 to 35 percent alumina, about 5 to 20 percent soda, and about 5 to 25 percent silica.

5. Pellets of agglomerated particulate material suitable for metallurgical fluxing consisting essentially of lime, soda ash, bauxite, sand, and iron oxide in amounts sufficient to provide the equivalent of by weight about 20 to 35 percent lime, about 20 to 35 percent alumina, about 5 to 20 percent soda, about 5 to 25 percent silica, and about 1 to 20 percent hematite.

6. Pellets of agglomerated particulate material suitable for metallurgical fluxing consisting essentially of lime, sodium silicate, bauxite, sand, and iron oxide in amouts sufficient to provide the equivalent of by weight about 20 to 35 percent lime, about 20 to 35 percent alumina, about 5 to 20 percent soda, about 5 to 25 percent silica, and about 1 to 20 percent hematite.

7. A process for producing agglomerates of particulate material suitable for metallurgical fluxing comprising the steps of agglomerating a mixture consisting essentially of source materials for lime, alumina, soda, and silica in amounts sufficient to provide the equivalent of from about 20 to 35 percent lime, about 20 to 35 percent alumina, about 5 to 20 percent soda, and about 5 to 25 percent silica with sufficient water to provide a pasty mass suitable for agglomerating, drying said agglomerates at a temperature of about 200 to 240° F., followed by sintering at a temperature of from about 1300 to 1600° F.

8. A process for producing agglomerates of particulate material suitable for metallurgical fluxing comprising the steps of agglomerating a mixture consisting essentially of source materials for lime, alumina, soda, silica, and iron oxide in amounts sufficient to provide equivalent amounts of about 20 to 35 percent lime, about 20 to 35 percent alumina, about 5 to 20 percent soda, about 5 to 25 percent silica, and about 1 to 20 percent hematite, with an amount of water sufficient to provide a pasty mass suitable for forming said agglomerates, drying said agglomerates at a temperature of about 200 to 240° F., and sintering said agglomerates at a temperature of from about 1300 to 1600° F.

9. A process for producing agglomerates of particulate material suitable for metallurgical fluxing comprising the steps of agglomerating a mixture consisting essentially of source materials for lime, alumina, soda, silica, iron oxide, and carbon in amounts sufficient to provide equivalent amounts of about 20 to 35 percent lime, about 20 to 35 percent alumina, about 5 to 20 percent soda, about 5 to 25 percent silica, about 1 to 20 percent hematite, and about 0.2 to 5 percent carbon with an amount of water sufficient to provide a pasty mass, forming said agglomerates, drying said agglomerates at a temperature of from about 200 to 240° F., and sintering said agglomerates at a temperature of from about 1300 to 1600° F.

References Cited by the Examiner

UNITED STATES PATENTS

| 1,890,485 | 12/1932 | Amsler | 75—53 |
| 2,416,179 | 2/1947 | Kemmer | 75—53 |
| 2,480,901 | 9/1949 | Bowden et al. | 75—53 |
| 2,842,434 | 7/1958 | Kippe | 75—53 X |
| 3,057,683 | 10/1962 | Lecis et al. | 75—3 X |

DAVID L. RECK, *Primary Examiner.*

H. F. SAITO, *Assistant Examiner.*